United States Patent
Kellum

(10) Patent No.: US 6,853,919 B2
(45) Date of Patent: Feb. 8, 2005

(54) METHOD FOR REDUCING REPEAT FALSE ALARM INDICATIONS IN VEHICLE IMPACT DETECTION SYSTEMS

(75) Inventor: Carroll C. Kellum, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 8 days.

(21) Appl. No.: 10/358,131

(22) Filed: Feb. 4, 2003

(65) Prior Publication Data

US 2004/0153244 A1 Aug. 5, 2004

(51) Int. Cl.[7] .......................... G06F 17/10; G01C 23/00
(52) U.S. Cl. .................. 701/301; 701/200; 701/96; 701/23; 701/25; 340/992; 180/167; 180/266; 180/274
(58) Field of Search .................. 701/301, 1, 23, 701/25, 36, 96, 200; 340/988, 992; 73/178 R; 180/167, 168, 169, 271, 274, 286

(56) References Cited

U.S. PATENT DOCUMENTS

| | | | |
|---|---|---|---|
| 5,983,161 A | * 11/1999 | Lemelson et al. | .......... 701/301 |
| 6,201,493 B1 | 3/2001 | Silverman | .................... 342/20 |
| 6,445,308 B1 | * 9/2002 | Koike | ........................ 340/902 |
| 6,487,500 B2 | * 11/2002 | Lemelson et al. | .......... 701/301 |
| 6,662,141 B2 | * 12/2003 | Kaub | ......................... 702/181 |

FOREIGN PATENT DOCUMENTS

WO            01/11388           2/2001

* cited by examiner

Primary Examiner—Olga Hernandez
(74) Attorney, Agent, or Firm—Kathryn A. Marra

(57) ABSTRACT

A method for reducing repetitive false alarm indications in a vehicle impact detection system for a host vehicle includes generating false alarm positional information corresponding to a detected object determined to be a false alarm. The false alarm is determined subsequent to an issued warning to a driver, and the false alarm positional information is stored in a database. The false alarm positional information in the database is further evaluated to determine, based on predefined removal criteria, whether any of the false alarm positional information in the database is to be removed therefrom. The false alarm positional information remaining in the database is used to inhibit the issuance of a warning to a driver of the host vehicle.

14 Claims, 4 Drawing Sheets

METHOD FOR REDUCING REPEAT FALSE ALARM INDICATIONS IN VEHICLE IMPACT DETECTION SYSTEMS

STATEMENT OF GOVERNMENT SUPPORT

The Government of the United States of America has rights in this invention pursuant to NHTSA Cooperataive Agreement No. DTNH22-99-H-07019.

BACKGROUND

The present disclosure relates generally to vehicle object detection systems and, more particularly, to a method and system for reducing repeat false alarm indications in vehicle impact detection systems through position learning algorithms that maintain an editable database of false alarm object positions.

One of the more recent systems to be developed in the automotive industry is a collision warning system (CWS). A CWS is intended to mitigate and/or eliminate vehicle impacts by generating a timely warning to the driver to take an evasive action. Typically, a vehicle is configured with a sensor (or sensors) that is capable of detecting objects in the frontal area of the vehicle. The sensor not only detects the presence of an object, but also provides some quantitative information about the object such as range, range rate, and azimuth position of the object. Additional information related to the object (e.g., a lead vehicle in many instances) may include relative acceleration, the size of the object, the dimensions of the object, the direction of movement of the object, etc. Generally speaking, two main technologies are most prevalent in gathering such object information: (1) laser technology; and (2) radar technology.

In addition to the gathered object data, a CWS also typically incorporates a path prediction algorithm and a threat assessment algorithm, which evaluate the incoming data, analyze the particular situation, and then determine if there is any imminent threat of impacting an object in the frontal area of the vehicle. Many of these algorithms are based on parameters such as "time to impact", "time headway", or perhaps basic vehicle kinematics. In any case, a determined threat level above a given threshold will cause the CWS to issue a warning to the driver.

False alarms generated from a collision warning system are a source of nuisance to the driver. Such false alarms may result from erroneous information picked up from one or more of the sensors, or may be generated as the result of shortcomings in the threat assessment algorithm or path prediction algorithms themselves. Statistical measures, such as number of false alarms per mile driven or number of false alarms per hour of driving, are commonly used to measure the effectiveness of collision warning systems. Although previous efforts have been focused upon improving sensors, path prediction algorithms, threat assessment algorithms and the like to reduce the rate of false alarms, relatively little effort has been spent in reducing the number of false alarms resulting from a specific roadway property or object.

More specifically, it has been discovered that an individual roadway property or object has the ability to cause a false alarm each time the vehicle encounters the object. Accordingly, it would be desirable for a collision warning system to have the ability learn about specific properties or objects that lead to false alarms, and thereafter adjust the properties of the warning system algorithms appropriately. Thereby, a lower false alarm rate may be achieved.

SUMMARY

In an exemplary embodiment, a method for reducing repetitive false alarm indications in a vehicle impact detection system for a host vehicle includes generating false alarm positional information corresponding to a detected object determined to be a false alarm. The false alarm is determined subsequent to an issued warning to a driver, and the false alarm positional information is stored in a database. The false alarm positional information in the database is further evaluated to determine, based on predefined removal criteria, whether any of the false alarm positional information in the database is to be removed therefrom. The false alarm positional information remaining in the database is used to inhibit the issuance of a warning to a driver of the host vehicle.

In another aspect, a vehicle impact detection system for a host vehicle includes an object detection system for identifying objects in a projected path of the host vehicle, the object detection system further having a position tracking mechanism for associating an identified object with a reference coordinate system. A threat assessment algorithm evaluates the likelihood of an impact between the host vehicle and objects detected by the object detection system. A driver warning mechanism provides a warning to a driver, the driver warning responsive to an output of the threat assessment algorithm. In addition, a false alarm learning mechanism is used for generating and storing in a database false alarm positional information corresponding to a detected object determined to be a false alarm. The false alarm learning mechanism periodically evaluates the false alarm positional information in the database and determines, based on predefined removal criteria, whether any of the false alarm positional information in the database is to be removed therefrom. False alarm positional information remaining in the database is used to inhibit the issuance of a warning from the driver warning mechanism.

BRIEF DESCRIPTION OF THE DRAWINGS

Referring to the exemplary drawings wherein like elements are numbered alike in the several Figures.

DETAILED DESCRIPTION

Disclosed herein is a method and system for reducing repeat false alarms in vehicle impact detection systems. Broadly stated, a database of locations where false alarms have been experienced by the vehicle is created, maintained, and updated by a "learning algorithm" block, which (among other aspects) is capable of both adding and subtracting false alarm object information from the database. An impact detection system in a host vehicle includes an object detection and positioning system (utilizing a fixed reference coordinate system), a threat assessment algorithm, and other appropriate sensors for providing input to the threat assessment algorithm, wherein the learning algorithm enhances the false alarm performance of the impact detection system.

Figure 1:
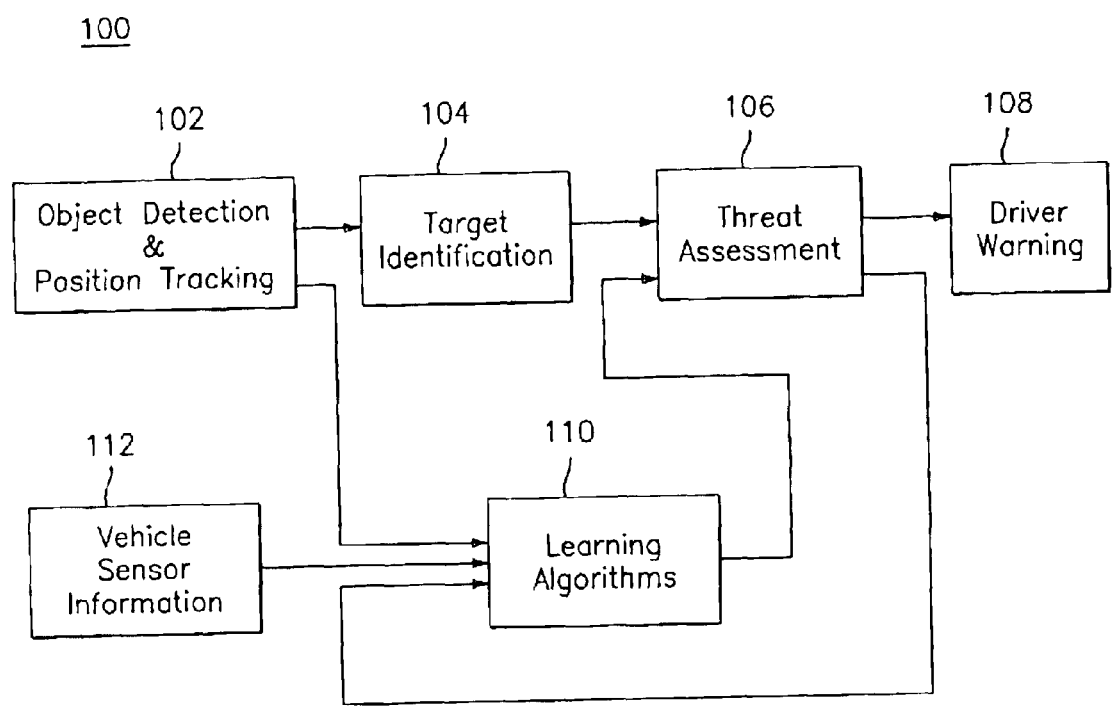
FIG. 1 is a block diagram illustrating an exemplary vehicle impact detection system suitable for use in accordance with an embodiment of the invention.

Referring initially to FIG. 1, there is shown a block diagram of an exemplary vehicle impact detection system 100 suitable for use in accordance with an embodiment of the invention. System 100 includes an object detection and position tracking block 102, a target identification block 104, a threat assessment block 106 and a driver warning block 108. The object detection portion of object detection block 102 may include radar or laser position object detection means, or other equivalents known to those skilled in the art. In addition, block 102 further includes a position tracking means, such as GPS, in order to associate a detected object with a fixed coordinate system.

The target identification block 104 receives input information from the object detection block 102 in order to identify the nature of the objects detected (e.g., size, shape, location, speed, acceleration, etc.) and thus determine whether any of the detected objects are "targets", i.e., potentially in the path of the host vehicle. In turn, the threat assessment block 106 receives the target identification information from block 104, as well as additional information such as host vehicle speed and acceleration, and thereby determines whether there is a likelihood of an impact with a particular identified target object. If so, a corresponding signal is sent to the driver warning block 108, wherein an appropriate warning signal (e.g., a buzzer, warning light or other type of haptic feedback) is brought to the driver's attention.

The description of the impact detection system 100 elements thus far should be familiar to those skilled in the art. However, as is also shown in FIG. 1, the system 100 further includes block 110 that contains a plurality of subroutines (collectively designated "learning algorithms") for reducing the occurrence of repeat false alarm indications. As is described in further detail hereinafter, block 110 receives the object detection and position tracking information from block 102, as well as the threat assessment information from block 106, to execute a series of subroutines to generate, update and utilize false alarm object information. Furthermore, the learning algorithms block 110 utilizes various vehicle sensor input information to assist in determining false alarm conditions (e.g., steering information, braking information, etc.) as depicted by block 112. Accordingly, block 110 provides a feedback input to the threat assessment block 106.

Figure 2:
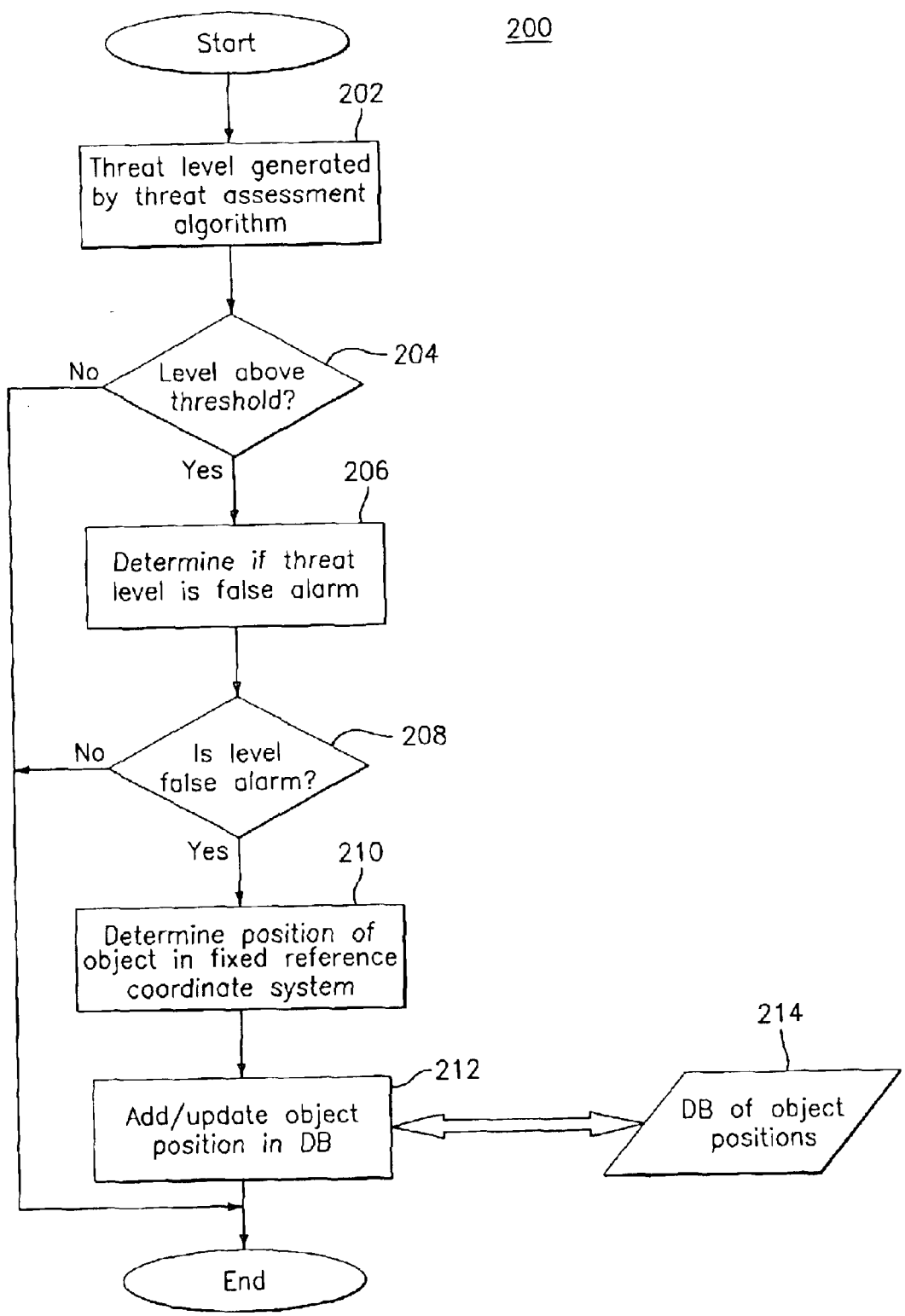
FIG. 2 is a flow diagram illustrating a subroutine, included within the "learning algorithms" block of FIG. 1, for generating a database (DB) of object positions/locations, in accordance with an embodiment of the invention.

FIG. 2 is a flow diagram that illustrates a subroutine 200 for generating a database (DB) of object positions/locations. At block 202, a threat level is generated by the threat assessment algorithm. This process is repeated at specified intervals (e.g., every 2 ms) during the operation of the algorithm. If this threat level does not exceed a certain threshold, as determined in decision block 204, then no impact is imminent, and the subroutine exits. However, if the threat level does exceed a threshold, then the subroutine proceeds to block 206 to see whether the threat level is a false alarm. This determination may be made, for example, by implementing a suitable algorithm that utilizes driver response to an issued alarm triggered by the exceeded threshold. Thus, for example, if no evasive action (such as sudden steering, or hard braking) were taken by a driver, then the threat level may be a false alarm. In addition, the vehicle may be equipped with a feature that allows the driver to directly indicate that an issued warning signal was a false alarm, such as by pressing a button.

If the determined threat level turns out not to be a false alarm, then, the subroutine 200 exits from decision block 208. On the other hand, if the threat level is a false alarm, then the subroutine 200 proceeds from decision block 208 to block 210, wherein the position of the false alarm triggering object is determined with respect to a fixed reference coordinate system. Then, at block 212, the object and position information is added to (or updated within) an existing database 214 of object positions. In addition to position information, the database 214 may also include information regarding the length or range of the false alarm, along with the actual path taken by the vehicle in response thereto, as well as various sensor states and transition histories.

Figure 3:
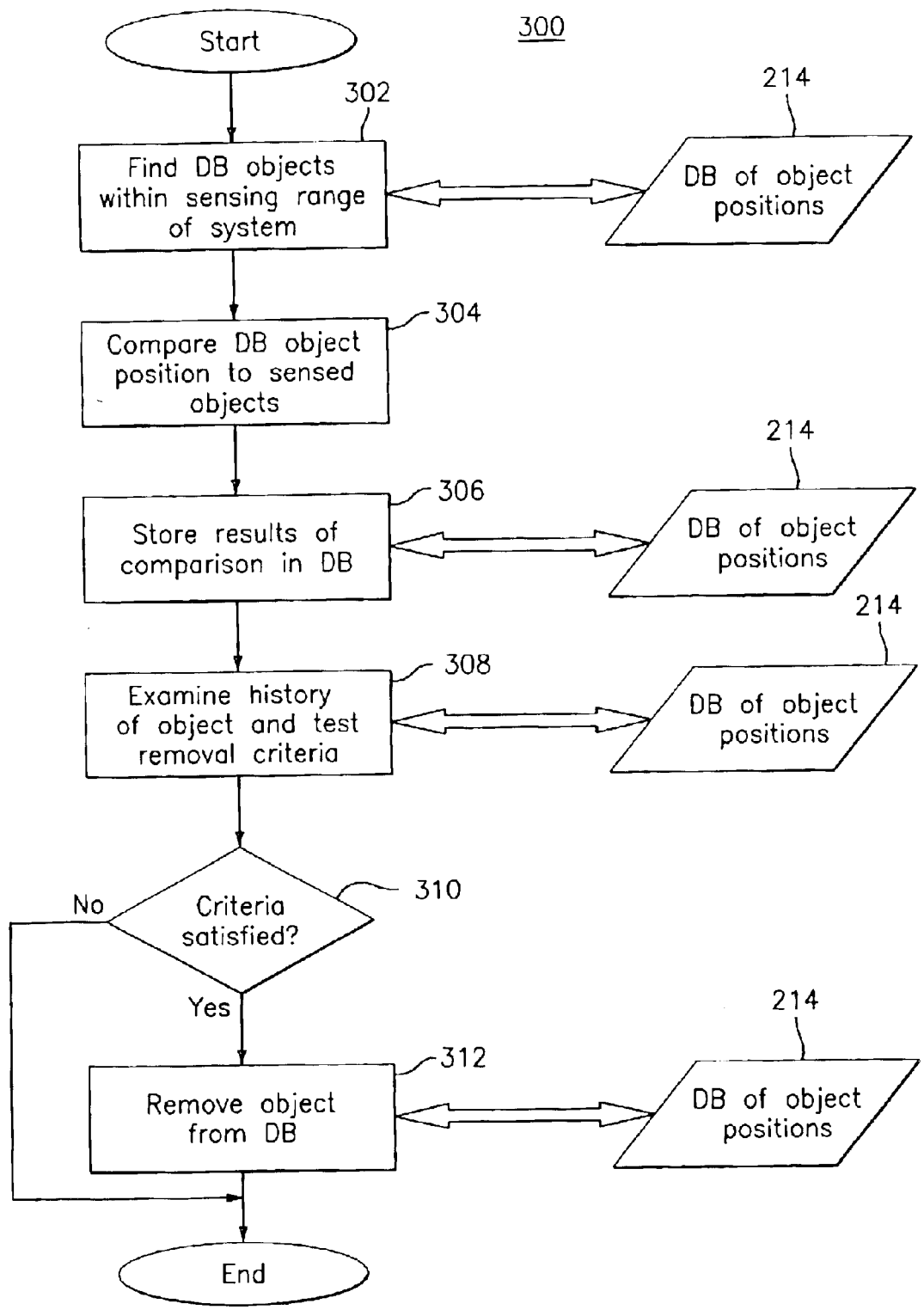
FIG. 3 is flow diagram illustrating another subroutine, included within the "learning algorithms" block of FIG. 1, for removing items from the database in accordance with a further embodiment of the invention.

Not only does the present method provide for the addition of new/updated false alarm information to the database 214, it also provides for the removal of such items therefrom. Accordingly, FIG. 3 is a flow diagram illustrating another subroutine 300 for removing items from the database 214. Beginning at block 302, subroutine 300 retrieves objects from the database that correspond to positions within a set range of the host vehicle. Naturally, as the host vehicle moves from point to point, certain stored objects will fall out of the set range, while others will fall into the set range, based on the new vehicle position. Thus, when the host vehicle approaches a location corresponding to an object position stored in the database, subroutine 300 compares the stored object position with all newly sensed objects by the vehicle, as shown at block 304.

The comparison between the sensed objects and the database position is used to determine whether the vehicle's sensors in fact "observed" the stored database object as the vehicle passed. The results of this comparison are also stored within the database 214 by an update thereto, as reflected in block 306. As the location of a given false alarm object in the database is passed a number of times by the host vehicle, a comparison history is produced (i.e., a set of observed/not observed) flags or indicators. It may be that every time an object location is passed, the presence of the false alarm object is verified and recorded. However, it could also be the case that presence of the object is not verified one or more times after the initial recording of the object position within the database 214. Thus, the subroutine proceeds to block 308 where the history of object data is examined to see whether the object should be removed from the database.

The removal criteria may be established by any suitable historical conditions, such as a certain number of "object not observed" flags present in the history or, alternatively, a consecutive recording of object not observed" flags during successive comparisons. It will be understood that the removal criteria is preferably structured so as to remove unreliable false alarm objects from the database, while still allowing for the possibility that the host vehicle's object detection system could have erroneously failed to recognize the false alarm object during an isolated instance. In addition, the criteria may be specifically tailored to whether the object is moving or stationary. Accordingly, if the removal criteria is satisfied, the subroutine 300 proceeds from decision block 310 to block 312, where the false alarm object is removed from the database 214. Otherwise, the subroutine 300 is exited at that point.

Still another possibility is that a recorded false alarm object, whenever re-encountered by the vehicle, may not be subsequently identified as a threat by threat assessment algorithm 106. As such, this situation would also warrant the removal of that false alarm object from the database 214. Thus, the removal criteria may also include an inquiry and comparison as to the number of times the threat assessment algorithm 106 continues to identify the recorded false alarm object as a threat.

Figure 4:
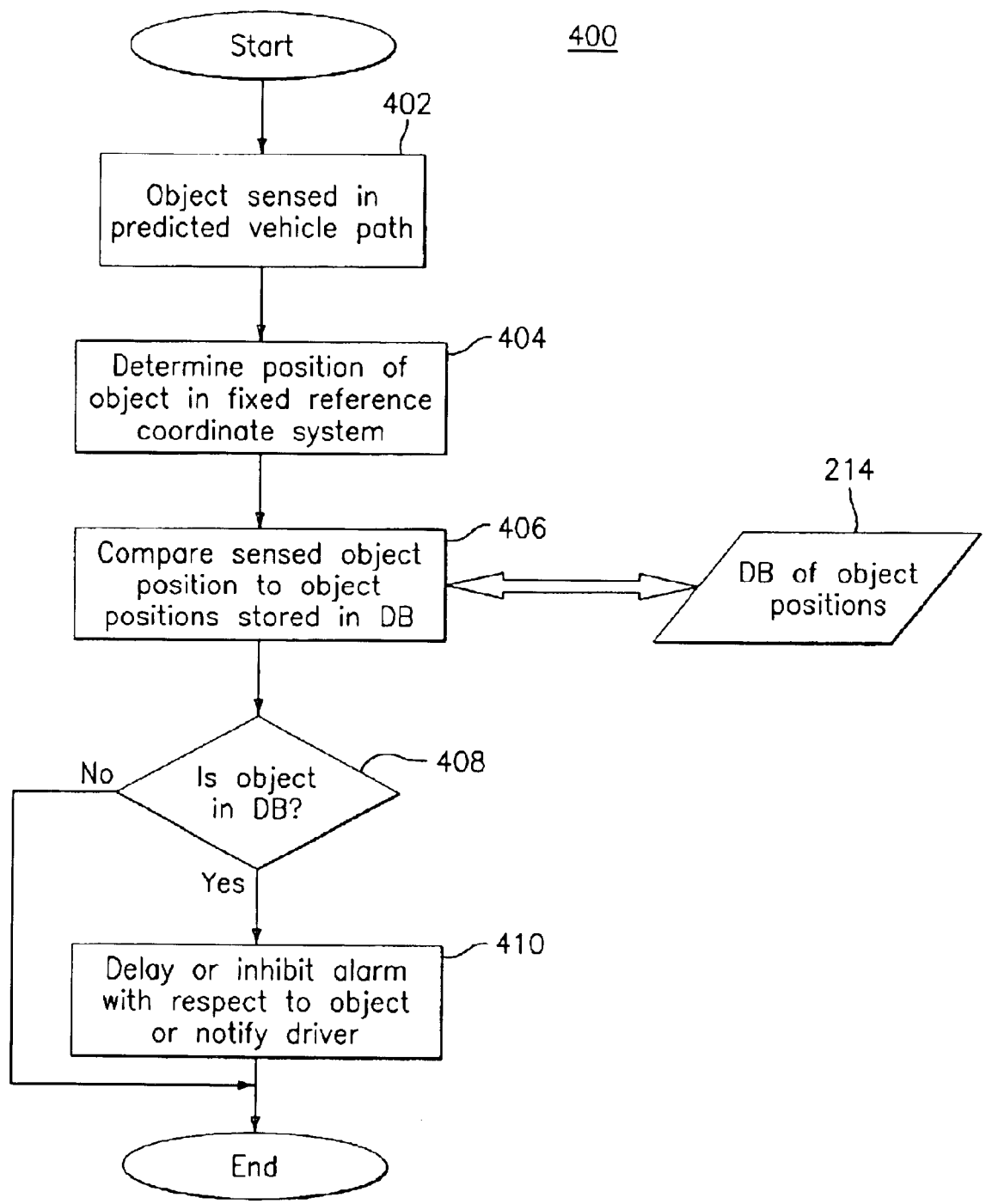
FIG. 4 is a flow diagram illustrating another subroutine, included within the "learning algorithms" block of FIG. 1, for integrating the database with the remainder of the impact detection system elements in accordance with a further embodiment of the invention.

Finally, FIG. 4 is a flow diagram of still another subroutine 400 illustrating how the database 214 may be utilized/integrated in practical operation of a vehicle impact detection system. Once an object is sensed within the projected host vehicle path, as shown in block 402, the position of the object with respect to the fixed reference coordinate system (as discussed above) is also determined, as shown in block 404. Then, the position of the sensed object is compared to object positions stored in the database 214, as illustrated at block 406. If it is determined at decision block 408 that the sensed object corresponds to a stored object for that position in the database 214 (i.e., the sensed object is a false alarm, according to the database 214), then an appropriate action will be taken in the impact detection system. More specifically, if a match does not exist, the determined threat levels and nominal alarm indications characteristic of the impact detection system are unchanged by subroutine 400. On the other hand, if a match does exist, suggesting the sensed object has caused false alarms in the past, any nominal alarm indications characteristic of the impact detection system may be inhibited or otherwise delayed so as to prevent another false alarm, as shown at block 410.

As will be appreciated, the above described methodology may be incorporated into existing vehicle GPS positioning systems and sensors to reduce the occurrence of repeat false alarms, with the only additional cost arising in the form of extra memory and processing time. Thus, the above invention embodiments are well suited for impact detection applications such as forward collision warning (FCW) systems. However, it will also be appreciated that this approach is equally applicable (in addition to warning systems) to other applications where a driver is not physically in complete control of the specific system, such as in avoidance systems, lane following systems, and adaptive cruise control, to name a few.

As will also be appreciated, the disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for reducing repetitive false alarm indications in a vehicle impact detection system for a host vehicle, the method comprising:

generating false alarm positional information corresponding to a detected object determined to be a false alarm, said false alarm being determined subsequent to an issued warning to a driver, and storing said false alarm positional information in a database; and periodically evaluating said false alarm positional information in said database and determining, based on predefined removal criteria, whether any of said false alarm positional information in said database is to be removed therefrom;

wherein said false alarm positional information remaining in said database is used to inhibit the issuance of a warning to a driver of the host vehicle.

2. The method of claim 1, wherein said evaluating said false alarm positional information further comprises:

accessing false alarm objects in said database having associated positional information corresponding to a present sensing range of the impact detection system;

determining whether said accessed false alarm objects in said database are presently observed by the impact detection system and recording the results thereof, thereby updating an object history for each of said accessed false alarm objects; and examining said updated object history for each of said accessed false alarm objects;

wherein if said updated object history for a given false alarm object satisfies a removal criteria, then removing said given false alarm object from said database.

3. The method of claim 2, further comprising storing said object history within said database.

4. The method of claim 3, wherein said object history for a given false alarm object comprises a set of observed/not observed flags stored in said database, wherein an observed flag results from the vehicle impact detection system observing the false alarm object at the position associated therewith, and a not observed flag results from the vehicle impact system not observing the false alarm object at the position associated therewith.

5. The method of claim 4, wherein said removal criteria for a given false alarm object is based on a comparison between the number of observed flags and not observed flags recorded in said database.

6. A method for reducing repetitive false alarm indications in a vehicle impact detection system for a host vehicle, the method comprising:

generating false alarm positional information corresponding to a detected object determined to be a false alarm, said false alarm being determined subsequent to an issued warning to a driver, and storing said false alarm positional information in a database; and periodically evaluating said false alarm positional information in said database and determining, based on predefined removal criteria, whether any of said false alarm positional information in said database is to be removed therefrom;

wherein said false alarm positional information remaining in said database is used to inhibit the issuance of a warning to a driver of the host vehicle;

wherein said removal criteria for a given false alarm object is based on the number of times a threat assessment algorithm within the vehicle impact detection system continues to identify the false alarm object as a threat.

7. The method of claim 1, further comprising:

sensing an object in a predicted path of travel of the host vehicle;

determining the position of said sensed object with respect to a fixed coordinate system; and comparing said position of said sensed object with stored positional information in said database;

wherein if said database contains a false alarm object having positional information corresponding to the position of said sensed object, then the issuance of a warning to a driver of the host vehicle is inhibited.

8. A vehicle impact detection system for a host vehicle, comprising:

an object detection system for identifying objects in a projected path of the host vehicle, said object detection system having a position tracking mechanism for associating an identified object with a reference coordinate system;

a threat assessment algorithm for evaluating the likelihood of an impact between the host vehicle and objects detected by said object detection system;

a driver warning mechanism for providing a warning to a driver, said driver warning responsive to an output of said threat assessment algorithm; and a false alarm learning mechanism for generating and storing in a database false alarm positional information corresponding to a detected object determined to be a false alarm;

said false alarm learning mechanism periodically evaluating said false alarm positional information in said database and determining, based on predefined removal criteria, whether any of said false alarm positional information in said database is to be removed therefrom;

wherein said false alarm positional information remaining in said database is used to inhibit the issuance of a warning from said driver warning mechanism.

9. The vehicle impact detection system of claim 8, wherein said evaluating said false alarm positional information further comprises:

accessing false alarm objects in said database having associated positional information corresponding to a present sensing range of the impact detection system;

determining whether said accessed false alarm objects in said database are presently observed by the impact detection system and recording the results thereof, thereby updating an object history for each of said accessed false alarm objects; and examining said updated object history for each of said accessed false alarm objects;

wherein if said updated object history for a given false alarm object satisfies a removal criteria, then said given false alarm object is removed from said database.

10. The vehicle impact detection system of claim 9, wherein said false alarm learning mechanism stores said object history within said database.

11. The vehicle impact detection system of claim 10, wherein said object history for a given false alarm object comprises a set of observed/not observed flags stored in said database, wherein an observed flag results from the vehicle impact detection system observing the false alarm object at the position associated therewith, and a not observed flag results from the vehicle impact system not observing the false alarm object at the position associated therewith.

12. The vehicle impact detection system of claim 11, wherein said removal criteria for a given false alarm object is based on a comparison between the number of observed flags and not observed flags recorded in said database.

13. A vehicle impact detection system for a host vehicle, comprising:

an object detection system for identifying objects in a projected path of the host vehicle, said object detection system having a position tracking mechanism for associating an identified object with a reference coordinate system;

a threat assessment algorithm for evaluating the likelihood of an impact between the host vehicle and objects detected by said object detection system;

a driver warning mechanism for providing a warning to a driver, said driver warning responsive to an output of said threat assessment algorithm; and a false alarm learning mechanism for generating and storing in a database false alarm positional information corresponding to a detected object determined to be a false alarm;

said false alarm learning mechanism periodically evaluating said false alarm positional information in said database and determining, based on predefined removal criteria, whether any of said false alarm positional information in said database is to be removed therefrom;

wherein said false alarm positional information remaining in said database is used to inhibit the issuance of a warning from said driver warning mechanism;

wherein said removal criteria for a given false alarm object is based on the number of times said threat assessment algorithm continues to identify the false alarm object as a threat when encountered.

14. The vehicle impact detection system of claim 8, wherein said false alarm learning mechanism compares the position of a sensed object in a predicted path of travel of the host vehicle with stored positional information in said database, and if said database contains a false alarm object having positional information corresponding to the position of said sensed object, then said false alarm learning mechanism inhibit the issuance of a warning from said driver warning mechanism.

* * * * *